United States Patent
Joffe et al.

(10) Patent No.: US 11,809,248 B2
(45) Date of Patent: Nov. 7, 2023

(54) SYSTEMS AND METHODS FOR DELIVERING POWER TO A COMMUNICATION DEVICE

(71) Applicant: ADTRAN, Inc., Huntsville, AL (US)

(72) Inventors: Daniel M. Joffe, Owens Crossroads, AL (US); Jon Michael Chalmers, Madison, AL (US); David Bernard Etzkorn, Hazel Green, AL (US)

(73) Assignee: ADTRAN, INC., Huntsville, AL (US)

( * ) Notice: Subject to any disclaimer, the term of this patent is extended or adjusted under 35 U.S.C. 154(b) by 0 days.

(21) Appl. No.: 17/591,056

(22) Filed: Feb. 2, 2022

(65) Prior Publication Data

US 2023/0244289 A1    Aug. 3, 2023

(51) Int. Cl.
    *G06F 1/26*      (2006.01)
    *H02M 7/06*      (2006.01)

(52) U.S. Cl.
    CPC .............. *G06F 1/263* (2013.01); *H02M 7/06* (2013.01)

(58) Field of Classification Search
None
See application file for complete search history.

(56) References Cited

U.S. PATENT DOCUMENTS

| | | |
|---|---|---|
| 8,605,567 B2 | 12/2013 | Wilkes et al. |
| 8,861,554 B1 | 10/2014 | Schneider et al. |
| 9,069,539 B2 | 6/2015 | Schlichter |
| 9,092,208 B2 | 7/2015 | Schlichter et al. |
| 9,094,218 B2 | 7/2015 | Schlichter |
| 9,332,237 B2 | 5/2016 | Shinha et al. |
| 9,350,111 B1 | 5/2016 | Dyer et al. |
| 2003/0007339 A1* | 1/2003 | Harris ................... H05K 7/1457 361/788 |
| 2010/0106984 A1* | 4/2010 | Weng ...................... G06F 1/266 713/300 |
| 2010/0296647 A1* | 11/2010 | Chan ....................... H04L 67/56 379/413.02 |

* cited by examiner

*Primary Examiner* — Danny Chan
(74) *Attorney, Agent, or Firm* — Butler Snow LLP; Jon E. Holland

(57) ABSTRACT

A configurable connector is provided for a communication device, such as a gateway, that is located outdoors. The connector can engage with a corresponding interface of the gateway to provide communication signals and power signals to the communication device. The connector can be configured to select the power type provided to the communication device via the connector. The connector can have a first configuration to provide a first power type to the communication device or a second configuration to provide a second power type to the communication device. In the first configuration of the connector, power terminals of the connector can be connected directly to corresponding power wires providing the first power type. In the second configuration, the power terminals of the connector can be connected by jumpers to supplemental terminals in the connector that receive the second power type from the communication device.

12 Claims, 8 Drawing Sheets

SYSTEMS AND METHODS FOR DELIVERING POWER TO A COMMUNICATION DEVICE

BACKGROUND

The present application generally relates to a configurable connector for a communication device that can be used to deliver power of different types or formats to the communication device.

A communication device can be used to facilitate communication between different components of a communication network. Sometimes, the communication device may be located outside of a building and exposed to weather conditions. Typically, when the communication device is in an outside location, a weather-proof housing or enclosure can be used to protect the components inside of the communication device from the environment. In addition, the outdoor communication device may also have high voltage breakdown and isolation requirements to protect the components of the communication device from lightning surges.

Some communication devices can have an internal power supply to power the components of the communication device that can receive 48 V (volt) power from either a Power over Ethernet (PoE) source or a dedicated 48 V source. If the outdoor communication device is designed to receive power from only one of the PoE source or the 48 V source, then the compliance with any high voltage breakdown and isolation requirements can be relatively straightforward. However, if the communication device is intended to be used with multiple sources (e.g., the PoE source or the 48 V source), then compliance with high voltage breakdown and isolation requirements becomes more difficult and costly.

One way to permit the communication device to receive power from either the PoE source or the 48 V source is to use switches or relays inside the communication device that enable the selection of the appropriate power source. However, switches or relays that also comply with the high voltage breakdown and isolation requirements for the outdoor communication device can be expensive and bulky, thereby rendering them impractical for use in at least some applications. Similarly, the use of jumpers inside of the communication device (to select the appropriate power source) are also impractical because it can be difficult to maintain the weather-proof integrity of the housing or enclosure each time the housing is opened to change the configuration of the jumpers for the appropriate power source. Still another way to permit the communication device to receive power from either the PoE source or the 48 V source is to use two high-voltage power supplies in the communication device and then diode—or the isolated low voltage sides from the two power supplies. However, the use two of power supplies inside the communication device can be bulky and expensive, thereby rendering them impractical for use in at least some applications. Thus, a cheaper and easier way to enable an outdoor communication device to receive power from different sources, such as either a PoE source or a 48 V source, is needed.

BRIEF DESCRIPTION OF THE DRAWINGS

Wherever possible, the same reference numbers are used throughout the drawings to refer to the same or like parts.

DETAILED DESCRIPTION

Figure 1:
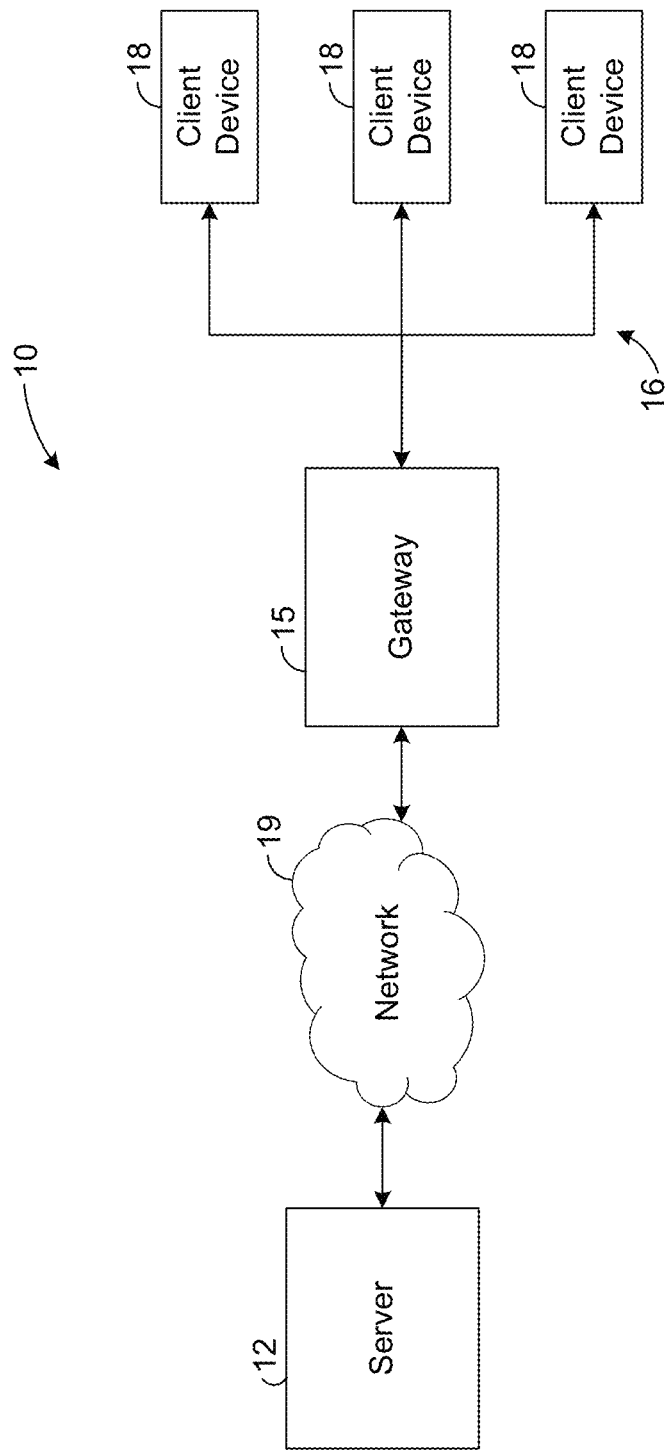
FIG. 1 is a block diagram showing an embodiment of a communication system.

The present application generally pertains to a configurable connector for a communication device, such as a gateway, that is located outdoors. The connector can engage with a corresponding interface of the communication device to provide communication signals, power signals and/or any other suitable signals to the communication device. The connector can be configured such that a particular power type of two or more different power types can be provided to the communication device without the need to incorporate expensive and bulky switches or relays within the communication device. The connector can have a first configuration that enables a first power type to be delivered to the communication device and a second configuration that enables a second power type to be delivered to the communication device, while adhering to appropriate voltage breakdown and isolation requirements for outdoor use. Thus, the communication device can be configured to accept a desired type of power signal by selecting a connector having an appropriate configuration for the desired power type, as described in more detail below.

In this regard, when a power signal of a first type is to be delivered to the communication device, a connector having a first configuration may be selected for use with the communication device. Such a connector may terminate an external cable carrying a power signal and be configured to deliver the power signal to a pair (or other number) of terminals, referred to hereafter as "power terminals," of a connector interface of the communication device. The connector may mate with the connector interface of the communication device such that wires in the cable carrying the power signal are electrically coupled to the power terminals. A power supply within the communication device may be electrically coupled to the power terminals such that the power signal is received by the power supply, which may use power from the power signal to power various electrical components of the communication device.

However, if a different type of power signal is to be delivered to the communication device, then a connector having a different configuration (a "second" configuration) may be selected for use with the communication device. Specifically, a connector may be selected such that the power signal carried by an external cable terminated by the connector is delivered to different terminals of the connector interface relative to the power terminals described above. Such terminals may be electrically coupled to processing circuitry within the communication device that processes the received signal in some way. As an example, assume that a power-over-Ethernet (PoE) signal is received, noting that such a signal carries both data and power. The processing circuitry may process the PoE signal to recover the data carried by the PoE signal and also extract a power signal from the PoE signal.

Such processing circuitry may be electrically coupled to a set of terminals of the connector interface, and the connector mated with the connector interface may include jumpers that electrically couple such terminals to the power terminals described above. Thus, the power signal extracted from the PoE signal passes back through the connector and, specifically, through the connector's jumpers to the power terminals and ultimately to the power supply in the communication device.

Thus, as illustrated above, switching between power types can be performed through selection of the connector mated with the communication device. Specifically, to deliver a first type of power signal to the communication device, a connector having the first configuration described above may be mated with the connector interface, but when a second type of power signal is to be delivered, the connector may be switched or otherwise changed to one having the second configuration described above. Thus, the switching between power types is effectively achieved through the selection of the appropriate connector configuration to use with the communication device, thereby eliminating the need to employ expensive and bulky switches within the communication device to switch between power types. Notably, the connector and the connector interface may be designed such that there is sufficient space between adjacent terminals to meet the applicable voltage breakdown and isolation requirements for outdoor use.

FIG. 1 shows an embodiment of a communication system 10. As shown by FIG. 1, the system 10 includes a gateway 15 that can facilitate communications between a server 12 and client devices 18. In addition, gateway 15 can also facilitate communications between the client devices 18. The server 12 can be connected to the gateway 15 by a network 19, such as a local area network (LAN) and/or a wide area network (WAN), such as the Internet. In some embodiments, the gateway 15 may at least partially be connected to the network 19 by a wired Ethernet connection. The gateway 15 can be connected to the client devices 18 by a network 16 (e.g., a LAN or WAN). For simplicity of illustration, FIG. 1 depicts three client devices 18 and one gateway 15, but there can be any number of client devices 18 associated with a gateway 15 or any number of gateways 15 in other embodiments.

In one embodiment, the network 16 can be a LoRaWAN (Long Range Wide Area Network) and can be used to implement an IoT (Internet of Things) ecosystem that includes the gateway 15 and the client devices 18. LoRaWAN is a long range, low power, wide area networking (LPWAN) protocol based on LoRa (Long Range) technology and can be used to wirelessly connect battery operated devices (e.g., client devices 18) to the Internet. In one embodiment, LoRa technology can be a spread spectrum modulation technique derived from chirp spread spectrum (CSS) technology. The client devices 18 can include any suitable type of device or sensor used for applications such as asset tracking, equipment monitoring, lighting controls, room occupancies, biometrics/card readers, motion sensing, contact tracing, etc.

Figure 2:
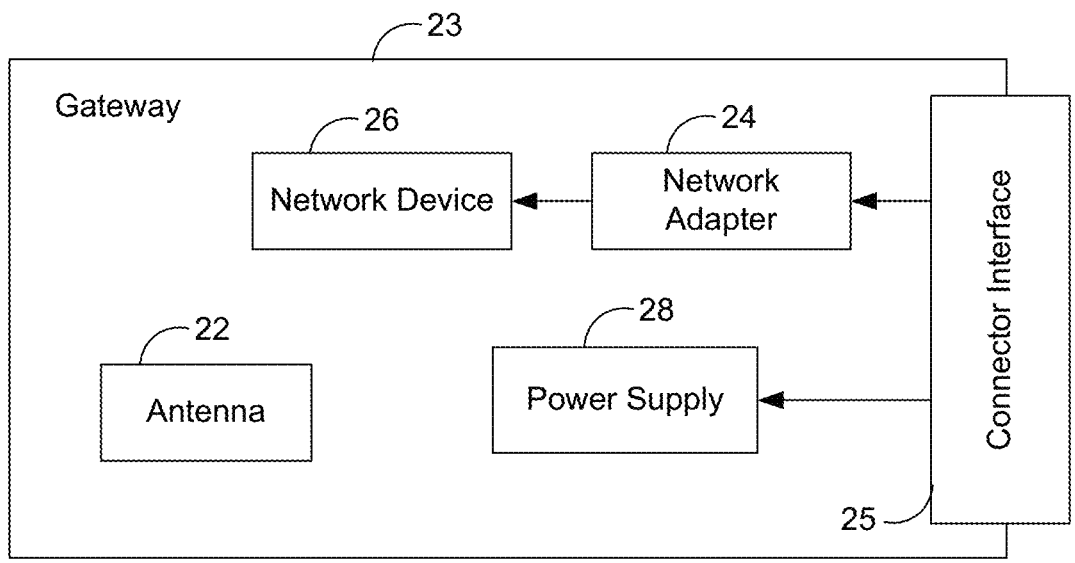
FIG. 2 is a block diagram showing an embodiment of a gateway from the telecommunication system of FIG. 1.
Figure 3:
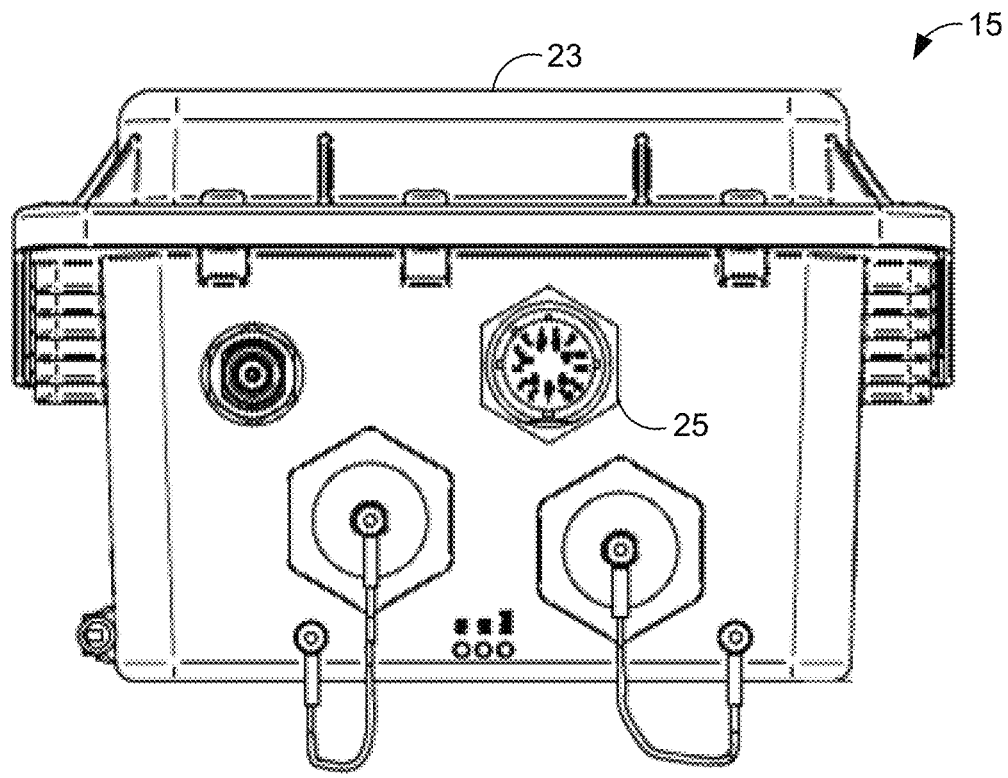
FIG. 3 is an end view of an embodiment of an enclosure for a gateway.
Figure 4:
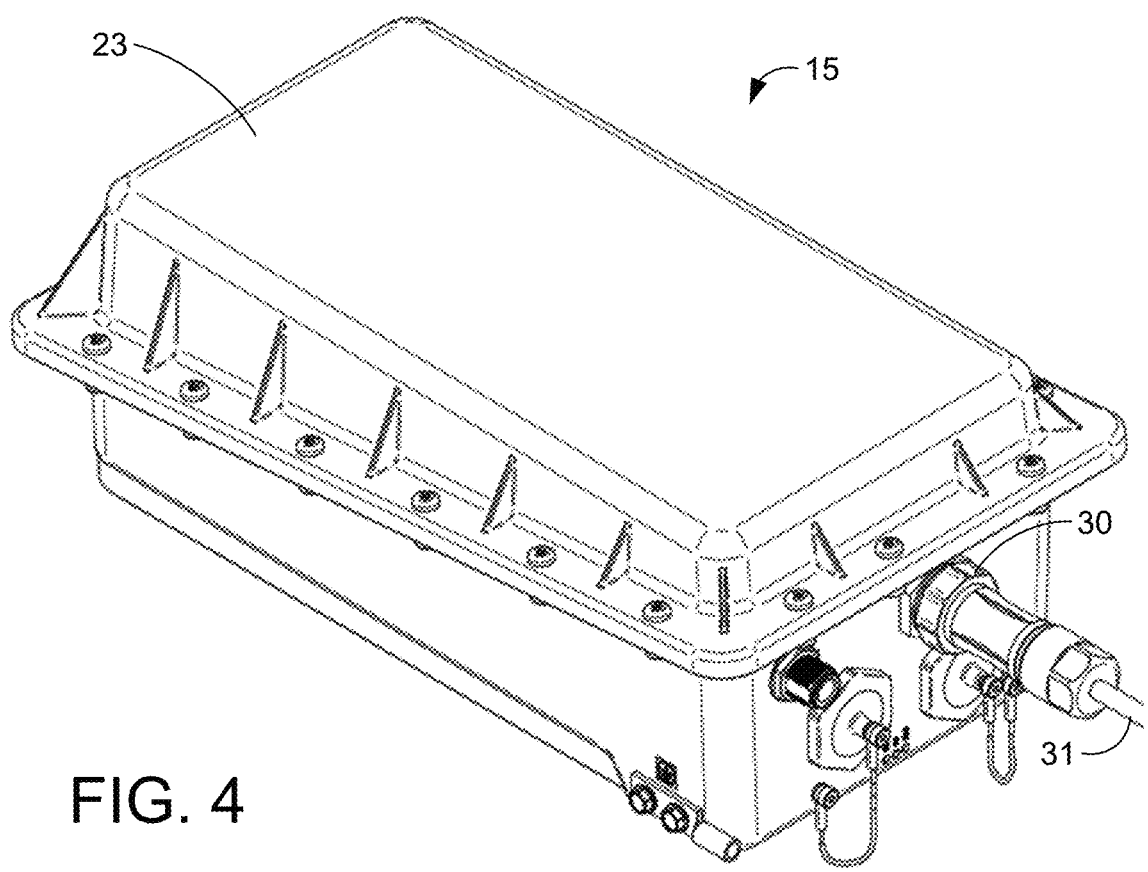
FIG. 4 is a perspective view of the enclosure of FIG. 3 with an attached connector.

FIGS. 2-4 show an embodiment of the gateway 15. In one embodiment, the gateway 15 can be mounted outdoors (e.g., on a cell phone tower or telephone pole) and can include a waterproof enclosure or housing 23. Within the enclosure 23, the gateway 15 can include an antenna 22 for communicating (i.e., sending and/or receiving) wireless signals with the client devices 18. In other embodiments, the antenna 22 can also be used to communicate with other devices wirelessly (e.g., server 12 via network 19). The gateway 15 can also include a power supply 28 and a network adapter 24 in communication with a network device 26 (such as an Ethernet physical layer device (Ethernet PHY)). The network adapter 24 and the power supply 28 can be connected to a connector interface 25 that permits external signals (e.g., power signals and network signals) to be provided through the enclosure 23 to the network device 26 (via the network adapter 24) and the power supply 28, as will be described in more detail below.

In an embodiment, the network adapter 24 can be configured to receive Ethernet signals from the connector interface 25 and provide the Ethernet signals to the network device 26. In addition, the network adapter 24 can be configured to extract any power signal included with the Ethernet signal (e.g., the power signal included with a Power over Ethernet (PoE) signal). The extracted power signal can then be provided to the power supply 28 via a connector mated with the connector interface 25. The network device or Ethernet PHY 26 can be an Ethernet transceiver for sending and receiving Ethernet signals (or frames) according to the IEEE 802.3 standard or other applicable standard or protocol. The power supply 28 can receive an input voltage (e.g., 48 V) and convert the input voltage to one or more suitable output voltages (e.g., 5 V, 3.3. V, 1.2 V) to power electrical components of the gateway 15. The power supply 28 can have a breakdown voltage of 6 kV and can include one or more transformers to provide isolation between the input voltage (to the power supply) and the output voltage (from the power supply) to permit the power supply 28 to withstand lightning surges. However, any suitable network adapter, Ethernet device or power supply can be used in other embodiments. In addition, it is to be understood that the gateway 15 may include additional components (e.g., amplifiers, processors, memory devices, etc.), which have been omitted from FIG. 2 for simplicity.

Figure 5:
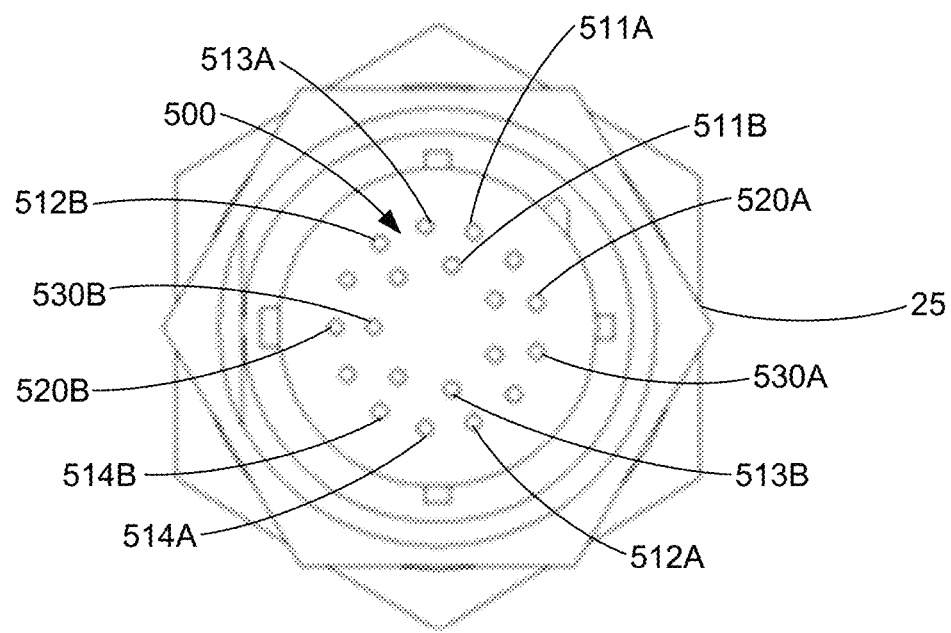
FIG. 5 is an end view of the interface of FIG. 3 identifying the terminals of the interface in an embodiment.

As shown in FIG. 5, the connector interface 25 can have a plurality of interface terminals 500 configured to facilitate the transfer of power signals and/or network signals from outside of the enclosure 23 to the power supply 28 and/or the network device 26 (via network adapter 24) located inside of the enclosure 23. In an embodiment, the interface terminals 500 can include 4 pairs of terminals for communicating network signals (511A, 511B; 512A, 512B; 513A, 513B; and 514A, 514B), a pair of terminals for communicating power signals (520A, 520B) and a pair of supplemental terminals (530A, 530B) that can be used to communicate signals from the gateway 15. In other embodiments, the interface terminals 500 may include additional terminals for communicating other signals.

Referring back to FIG. 4, the connector interface 25 of the gateway 15 can be mated with a connector 30 that terminates a cable 31 that binds a plurality of wires for carrying electrical signals. In an embodiment, the connector 30 can be a pluggable, sealed, twist-type connector known in the art, but other types of connectors can be used in other embodiments. The cable 31 binds wires that can carry network signals, power signals or any other suitable type of signal for components of the gateway 15. The connector 30 includes terminals that are electrically connected to the wires in the cable 31. More specifically, the terminals in the connector 30 can include terminals for communicating network signals, terminals for providing power signals and supplemental terminals for communicating signals as needed depending on the configuration of the connector 30.

Figure 6:
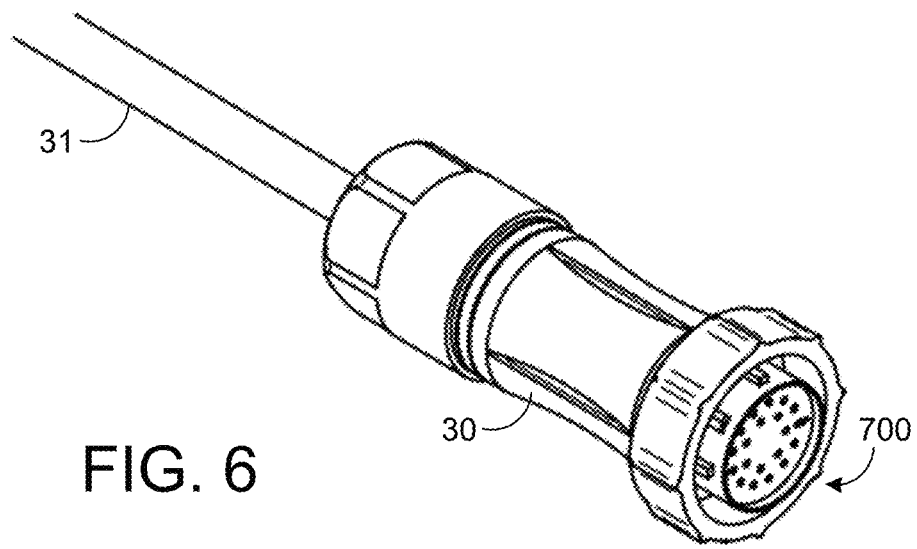
FIG. 6 is a perspective view of an embodiment of the connector connected to the enclosure of FIG. 4.
Figure 7:
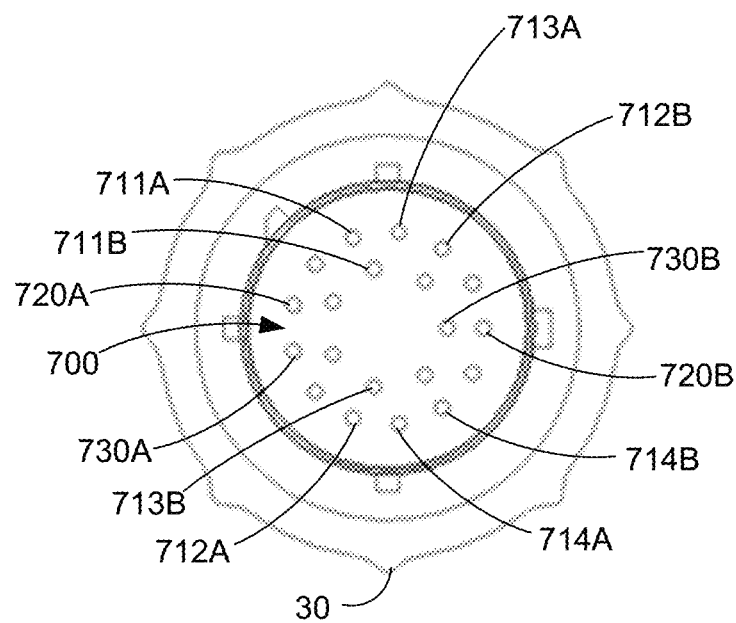
FIG. 7 is an end view of the connector of FIG. 6 identifying the terminals of the connector in an embodiment.

FIGS. 6 and 7 show the end of the connector 30 with connector terminals 700. When the connector 30 is mated with the connector interface 25, the connector terminals 700 make electrical contact with the interface terminals 500 such that signals (e.g., power signals and network signals) can be transferred between the connector terminals 700 and the interface terminals 500. In one embodiment, the interface terminals 500 may be male (e.g., conductive pins) and the connector terminals 700 may be female (e.g., receptacles) for receiving the conductive pins of the connector interface 25. Further, the walls of the receptacles may be conductive such that the pins of the interface terminals 500 are placed into electrical contact with the walls of the receptacles of the connector terminals 700 when the connector 30 is mated with the connector interface 25. In another embodiment, the interface terminals 500 may be receptacles and the connector terminals 700 may be pins. In still other embodiments, the interface terminals 500 and the connector terminals 700 can have any suitable configuration such that electrical contact occurs between the interface terminals 500 and the connector terminals 700 when the connector 30 is mated with the connector interface 25.

Preferably, the interface terminals 500 are spaced sufficiently far apart from each other to meet the applicable voltage breakdown and isolation requirements for outdoor use, noting that the connector terminals 700 (which are aligned with the interface terminals 500) also have similar spacing between each other. In some embodiments, the spacing is sufficient to withstand at least 6 kilo-Volts (kV) between the terminals, but other spacing may be used in other embodiments.

In the embodiment shown in FIG. 7, the connector terminals 700 of the connector 30 can include 4 pairs of terminals for communicating network signals (711A, 711B; 712A, 712B; 713A, 713B; and 714A, 714B), a pair of terminals for communicating power signals (720A, 720B) and a pair of supplemental terminals (730A, 730B). In other embodiments, the connector terminals 700 may include additional terminals for communicating other signals. The connector terminals 700 of the connector 30 can be sized to carry the required currents and spaced apart sufficiently to support the required breakdown and isolation voltages. As can be seen in FIG. 7, the spacing between the power terminals 720A and 720B and the selection of the other terminals (e.g., a pair of wires can have adjacent terminals) can be sufficient to provide for high voltage isolation and good data transmission. In an embodiment, when the connector 30 is mated with the connector interface 25, terminals 711A, 711B are placed into electrical contact with terminals 511A, 511B; terminals 712A, 712B are placed into electrical contact with terminals 512A, 512B; terminals 713A, 713B are placed into electrical contact with terminals 513A, 513B; terminals 714A, 714B are placed into electrical contact with terminals 514A, 514B; terminals 720A, 720B are placed into electrical contact with terminals 520A, 520B; and terminals 730A, 730B are placed into electrical contact with terminals 530A, 530B.

Figure 8:
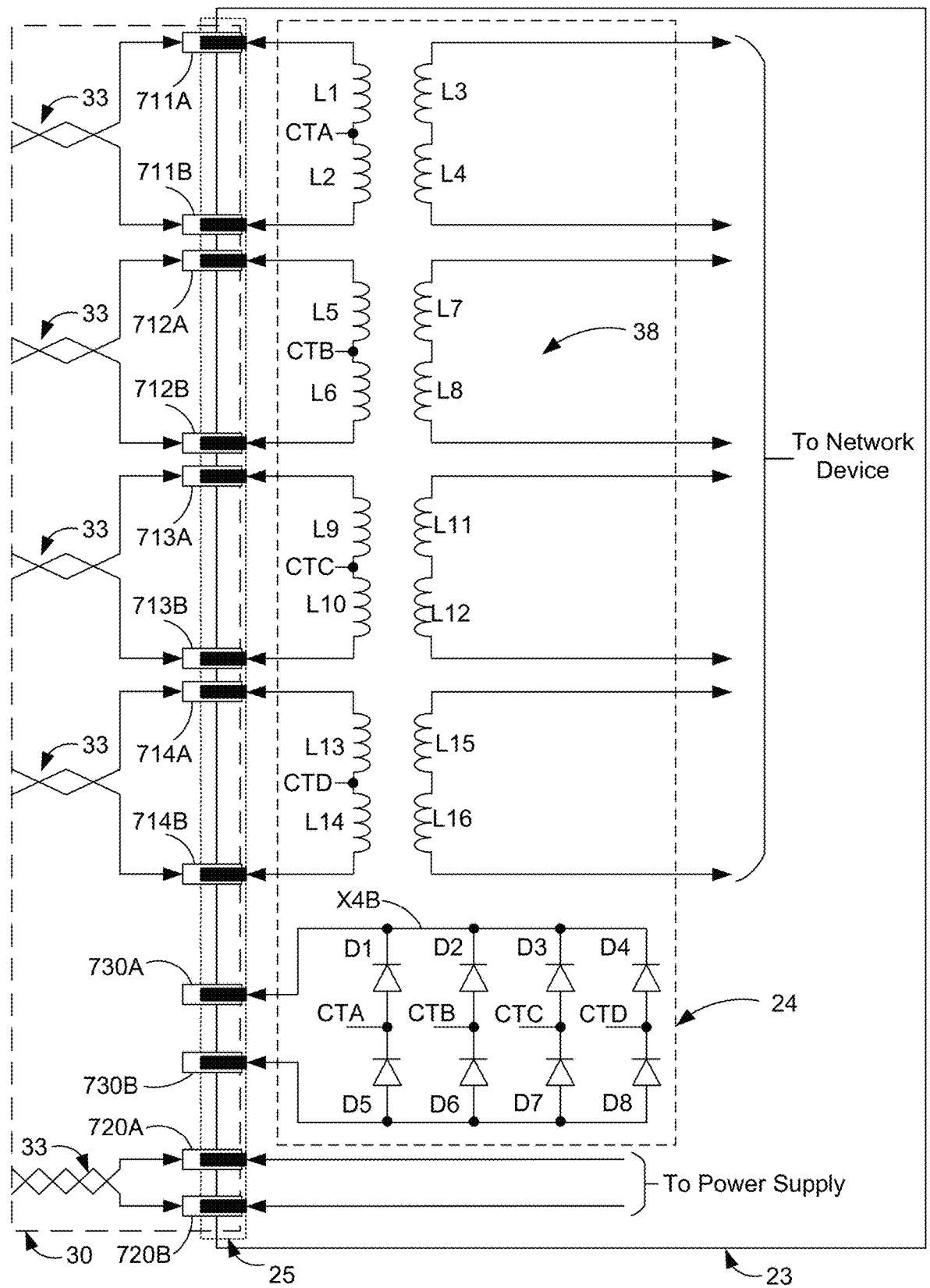
FIG. 8 is a partial wiring diagram showing a first embodiment of the connector connected to the enclosure.
Figure 9:
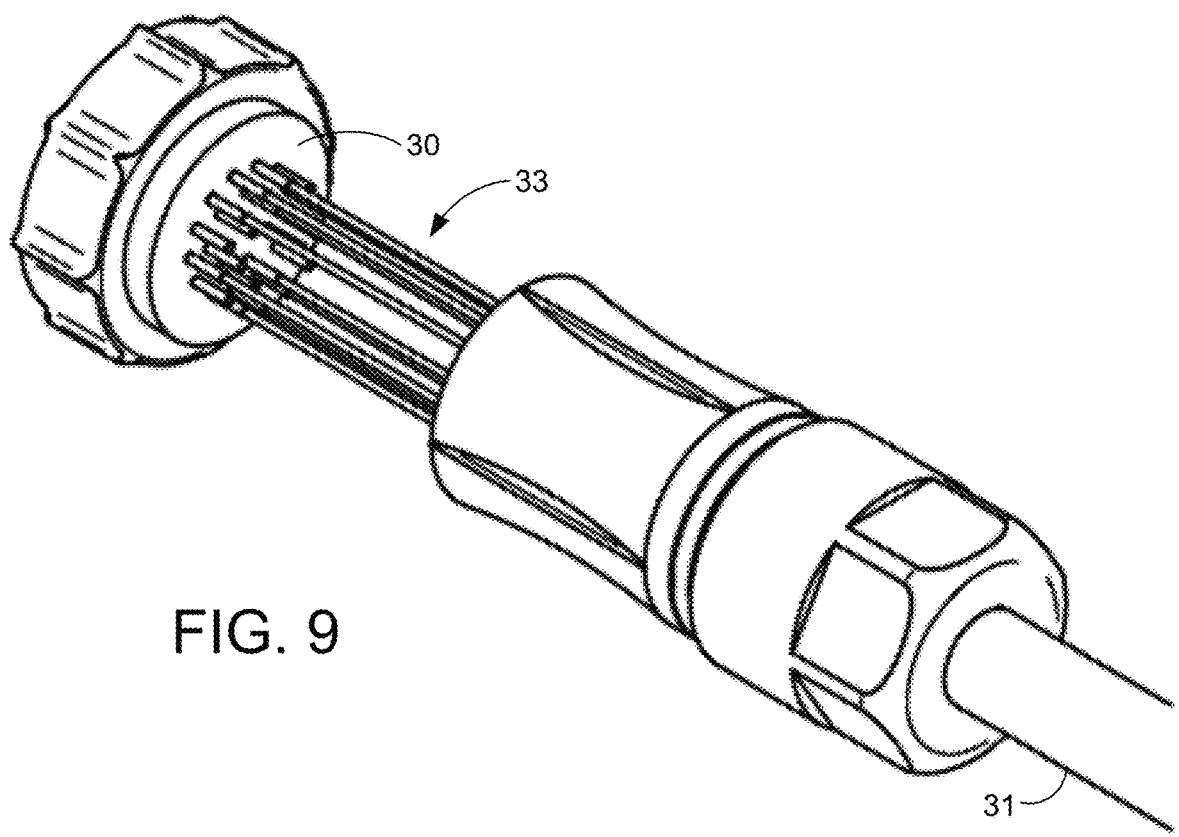
FIG. 9 is a partially exploded view of the first embodiment of the connector from FIG. 8.

FIGS. 8 and 9 show the connector 30 in a first embodiment or configuration that provides a dedicated 48 V DC power signal to the power supply 28 in the gateway 15. Eight wires 33 (e.g., 4 twisted pairs) carrying network (e.g., Ethernet) signals are electrically connected to corresponding connector (network) terminals 711A, 711B; 712A, 712B; 713A, 713B; and 714A, 714B, which are electrically coupled to corresponding interface (network) terminals 511A, 511B; 512A, 512B; 513A, 513B; and 514A, 514B (see FIG. 10). The interface (network) terminals 511A, 511B; 512A, 512B; 513A, 513B; and 514A, 514B are electrically connected to a processing circuit 38 of the network adapter 24 that can provide the network signals to the network device or Ethernet PHY 26. Another two wires 33 (e.g., 1 twisted pair) carrying a 48 V DC power signal is electrically coupled to corresponding connector (power) terminals 720A, 720B, which are electrically coupled to corresponding interface (power) terminals 520A, 520B (see FIG. 10). The interface (power) terminals 520A and 520B are electrically coupled to the power supply 28. The connector (supplemental) terminals 730A and 730B are mated with interface (supplemental) terminals 530A, 530B, but are not used when the connector 30 is in the first configuration.

Figure 11:
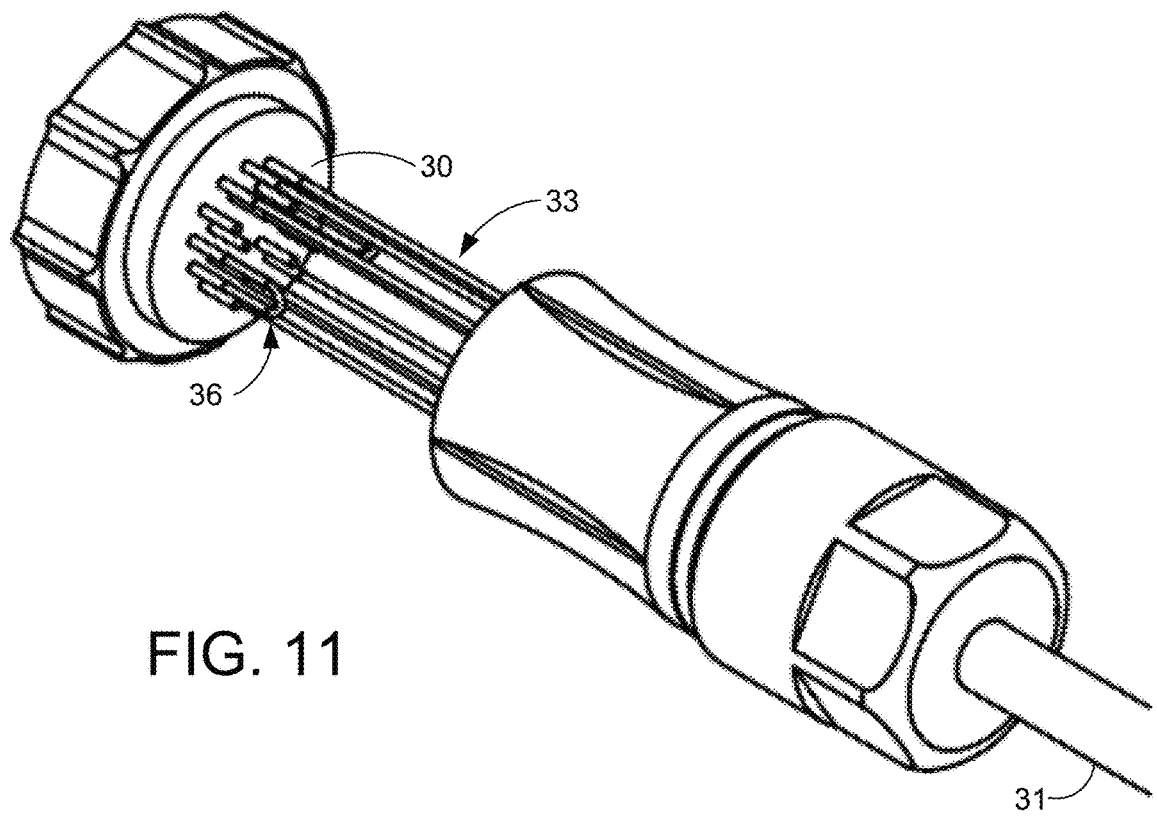
FIG. 11 is a partially exploded view of the second embodiment of the connector from FIG. 10.
Figure 10:
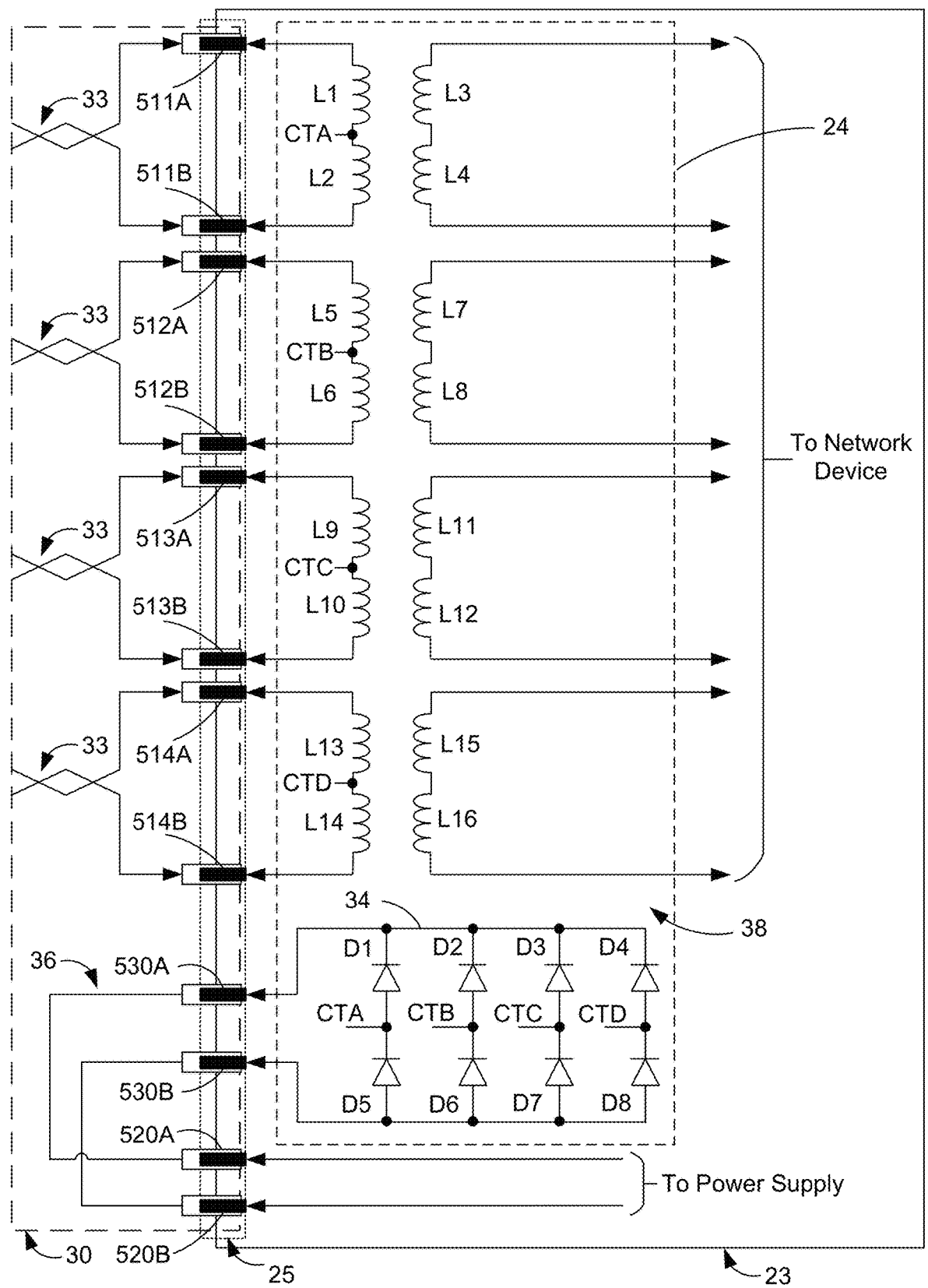
FIG. 10 is a partial wiring diagram showing a second embodiment of the connector connected to the enclosure.

FIGS. 10 and 11 show the connector 30 in a second configuration to provide PoE power (from the network adapter 24) to the power supply 28. Four twisted pair wires 33 carrying network signals with an additional DC power signal (e.g., PoE signals) are electrically connected to corresponding connector (network) terminals 711A, 711B; 712A, 712B; 713A, 713B; and 714A, 714B (see FIG. 8), which are electrically coupled to corresponding interface (network) terminals 511A, 511B; 512A, 512B; 513A, 513B; and 514A, 514B. The interface (network) terminals 511A, 511B; 512A, 512B; 513A, 513B; and 514A, 514B are electrically coupled to a processing circuit 38 of the network adapter 24 that can provide the network signals (without the additional DC power signal received at the interface (network) terminals) to the network device or Ethernet PHY 26 similar to that described above with respect to FIG. 8. In addition, the processing circuit 38 can extract the DC power signal that was included with the network signals received at the interface (network) terminals and provide the DC power signal to interface (supplemental) terminals 530A and 530B. The interface (supplemental) terminals 530A and 530B are electrically coupled to corresponding connector (supplemental) terminals 730A and 730B (see FIG. 8). Connector (supplemental) terminals 730A and 730B are electrically coupled to the connector (power) terminals 720A and 720B with jumpers 36 located inside of connector 30 to provide the extracted power signal from the processing circuit 38 of the network adapter 24 to the connector (power) terminals 720A and 720B. The connector (power) terminals 720A and 720B are electrically coupled to corresponding interface (power) terminals 520A, 520B, which are electrically coupled to the power supply 28, to provide the extracted power signal (from the processing circuit 38) to the power supply 28.

As shown in FIGS. 8 and 10, the processing circuit 38 can include: a first transformer, having inductors L1-L4 and a center tap connection CTA, connected to terminals 511A and 511B; a second transformer, having inductors L5-L8 and a center tap connection CTB, connected to terminals 512A and 512B; a third transformer, having inductors L9-L12 and have a center tap connection CTC, connected to terminals 513A and 513B; and a fourth transformer, having inductors L13-L16 and a center tap connection CTD, connected to terminals 514A and 514B. Each of the transformers has an output that is connected to the network device 26.

The processing circuitry 38 can also include a full-wave bridge rectifier 34. The bridge rectifier can be electrically connected to the center taps (CTA, CTB, CTC and CTD) of the transformers (though the electrical connections between the center taps of the transformers and the bridge rectifier 34 are not shown in FIGS. 8 and 10 for simplicity of illustration) and can extract the DC power signal (if provided) included with the network signal. The bridge rectifier 34 can incorporate diodes D1-D8 with the connection from center tap CTA connected between diodes D1 and D5, the connection from center tap CTB connected between diodes D2 and D6, the connection from center tap CTC connected between diodes D3 and D7, and the connection from center tap CTD connected between diodes D4 and D8. The bridge rectifier 34 is connected to interface (supplemental) terminals 530A and 530B. The interface (supplemental) terminals 530A and 530B can supply the extracted DC voltage signal (if provided) to the interface (power) terminals 520A and 520B via the jumpers 36 in the connector 30 when the interface terminals 500 are mated with the connector terminals 700. The configuration of the connector 30 in the second embodiment, which includes jumpers 36 between connector (supplemental) terminals 730A and 730B and connector (power) terminals 720A and 720B, permits the processing circuit 38 of the network adapter 24 to supply power to the power supply 28 via the connector 30 while still complying with all separation and voltage requirements for the enclosure 23 and without the need for bulky and expensive switching equipment inside of the enclosure 23 for switching between power types.

Figure 12:
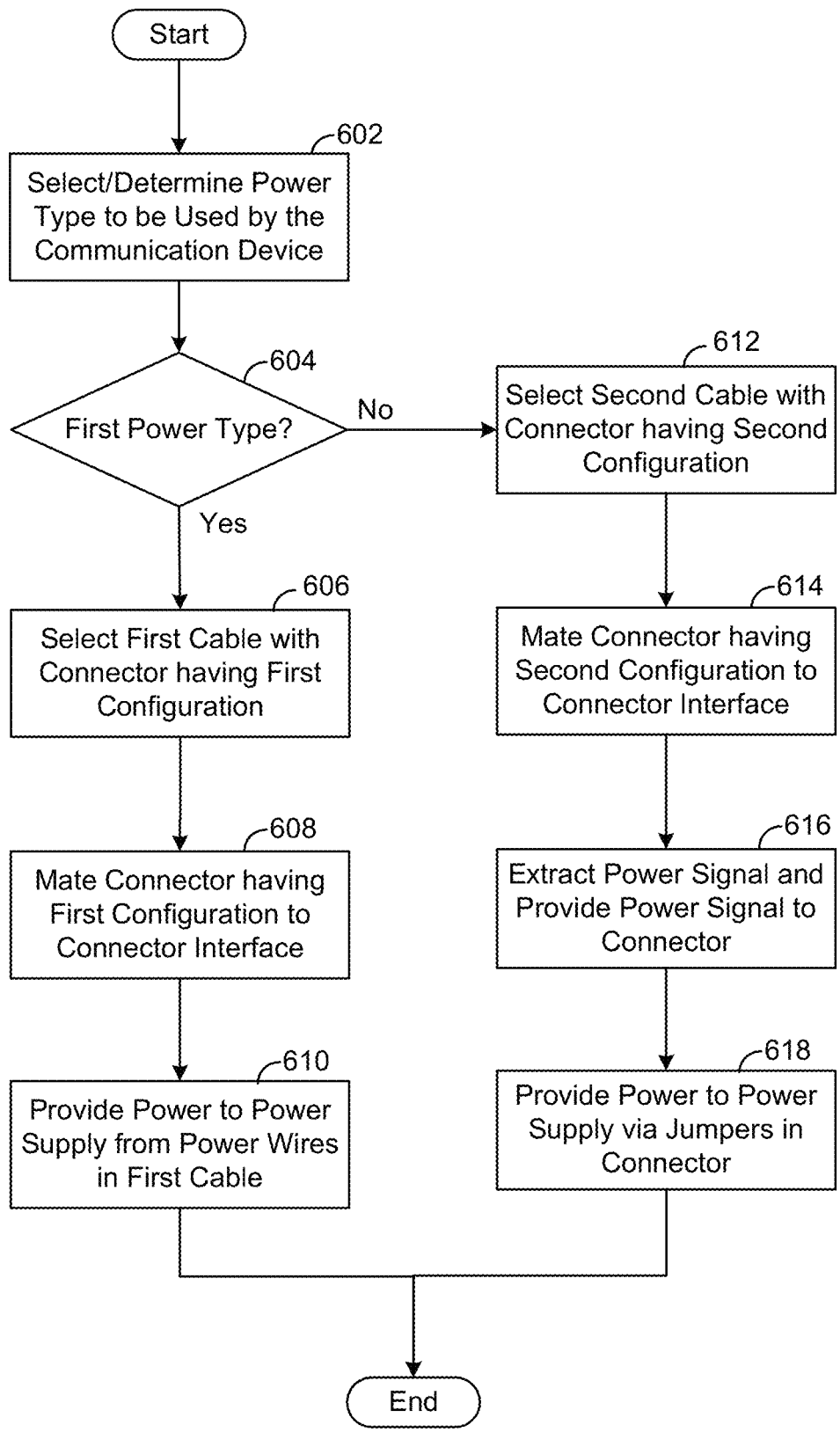
FIG. 12 is a flowchart showing an embodiment of a process for providing power to a communication device.

FIG. 12 shows an embodiment of a process for providing either a first power type (e.g., 48 V) or a second power type (e.g., PoE) to a communication device such as gateway 15. The process begins by selecting or determining the type of power to be used by the power supply of the communication device (step 602). If the first power type (e.g., 48 V) is selected, then a first cable 31 terminated by a first connector 30 with the first configuration can be selected (steps 604 and 606). The first connector 30 having the first configuration can be mated to the connector interface 25 (step 608) such that connector terminals 700 are electrically coupled to interface terminals 500. Power wires carrying a power signal of the first power type (e.g., 48 V) in the first cable 31 can be connected to the connector (power) terminals 720A, 720B in the first connector 30 to provide power to the power supply 28 (step 610). In this embodiment, the power signal passes from the first cable 31 directly through the connector (power) terminals 720A, 720B to the power supply, thereby bypassing the processing circuitry 38 and the connector (supplemental) terminals 730A, 730B.

If the first power type is not selected, then a second cable 31 terminated by a second connector 30 with the second configuration can be selected to provide the second power type (e.g., PoE) to the communication device (step 612). The second connector 30 having the second configuration can be mated to connector interface 25 (step 614) such that connector terminals 700 are electrically coupled to interface terminals 500. The second cable 31 can include wires carrying a network signal (e.g., PoE signal) from which a power signal may be extracted. The processing circuitry 38 extracts the power signal from the received network signal and provides the power signal to the second connector 30 at interface (supplemental) terminals 530A, 530B (step 616). The second connector 30 receives the power signal at connector (supplemental) terminals 730A, 730B and provides the power signal to power supply 28 with jumpers 36 in the second connector 30 connecting the connector (supplemental) terminals 730A, 730B to the connector (power) terminals 720A, 720B (step 618). By electrically coupling the connector (supplemental) terminals 730A, 730B to the connector (power) terminals 720A, 720B, the second connector 30 permits the power signal of the second type extracted by the processing circuitry 38 to pass through the second connector 30 and ultimately to the power supply 28 when the second connector 30 is mated with the connector interface 25.

Note that the system can be reconfigured to provide a different power type to the communication device 15 by simply changing the connector 30 that is mated with the connector interface 25. As an example, if the connector 30 is configured as shown by FIG. 8 to deliver a power signal directly to power terminals 720A and 720B, then the system can be reconfigured to provide a PoE signal by removing the connector 30 from the connector interface 25 and then mating a different connector 30, such as a connector 30 having the configuration shown by FIG. 10, with the connector interface 25. Similarly, a connector 30 having the configuration shown by FIG. 10 may be replaced with a connector 30 having the configuration shown by FIG. 8.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A system comprising:
   a communication device, the communication device comprising:
      a housing;
      a connector interface positioned on the housing, the connector interface having a first plurality of terminals, a second plurality of terminals, and a third plurality of terminals;
      processing circuitry positioned within the housing, the processing circuitry electrically coupled to the first plurality of terminals and configured to receive a power-over-Ethernet (PoE) signal from the first plurality of terminals, the processing circuitry electrically coupled to the second plurality of terminals and configured to extract a power signal from the PoE signal and transmit the power signal to the second plurality of terminals; and
      a power supply positioned within the housing and electrically coupled to the third plurality of terminals; and a connector mated with the connector interface, the connector external to the housing and terminating a cable having a plurality of wires for carrying the PoE signal, wherein the connector is configured to electrically couple the plurality of wires to the first plurality of terminals, and wherein the connector has a plurality of jumpers that electrically couple the second plurality of terminals to the third plurality of terminals such that the power signal is transmitted through the jumpers to the power supply.

2. The system of claim 1, wherein the processing circuit includes a plurality of transformers and a full-wave bridge rectifier connected to center taps of the plurality of transformers, wherein an output of the full-wave bridge rectifier is connected to the second plurality of terminals.

3. The system of claim 2, wherein the full-wave bridge rectifier is configured to extract the power signal from the PoE signal received by the first plurality of terminals.

4. The system of claim 2, wherein the full-wave bridge rectifier comprises a plurality of pairs of diodes, wherein each of the pairs of diodes is connected to a center tap of a corresponding transformer of the plurality of transformers.

5. The system of claim 1, wherein the connector has a plurality of terminals, and wherein each of the first plurality of terminals, the second plurality of terminals, and the third plurality of terminals of the connector interface contacts a respective one of the plurality of terminals of the connector when the connector is mated with the connector interface.

6. A method of providing power to a communication device having a housing, the method comprising:
receiving at the communication device a network signal transmitted by a plurality of wires of a first cable terminated by a first connector that is external to the housing, wherein the first connector is mated with a connector interface of the communication device during the receiving, wherein the connector interface is positioned on the housing and has a first plurality of terminals, a second plurality of terminals, and a third plurality of terminals, and wherein the first plurality of terminals are electrically coupled to the plurality of wires of the first cable when the first connector is mated with the connector interface such that the network signal is received from the first connector by processing circuitry that is within the housing and is electrically coupled to the first plurality of terminals;
extracting a power signal from the network signal with the processing circuitry; and
transmitting the power signal from the processing circuitry to a power supply located within the housing through the second plurality of terminals, the first connector, and the third plurality of terminals, wherein the first connector electrically couples the second plurality of terminals to the third plurality of terminals.

7. The method of claim 6, wherein the network signal is a power-over-Ethernet (PoE) signal.

8. The method of claim 6, wherein the extracting the power signal comprises extracting the power signal from the network signal with a full-wave bridge rectifier of the processing circuitry.

9. The method of claim 6, further comprising receiving at the communication device a second power signal transmitted by a plurality of wires of a second cable terminated by a second connector that is external to the housing, wherein the second connector is mated with the connector interface before the first connector is mated with the connector interface or after the first connector has been removed from the connector interface, and wherein the third plurality of terminals are electrically coupled to the plurality of wires of the second cable when the second connector is mated with the connector interface such that the second power signal passes from the plurality of wires of the second cable through the third plurality of terminals to the power supply bypassing the processing circuitry and the second plurality of terminals.

10. A system comprising:
a communication device, the communication device comprising:
a housing;
a connector interface positioned on the housing, the connector interface having a first plurality of terminals, a second plurality of terminals and a third plurality of terminals;
processing circuitry located within the housing and electrically coupled to the first plurality of terminals and the second plurality of terminals, the processing circuitry configured to receive a network signal from the first plurality of terminals, the processing circuitry further configured to extract a power signal from the network signal and transmit the power signal to the second plurality of terminals; and
a power supply electrically coupled to the third plurality of terminals; and
a connector mated with the connector interface, the connector external to the housing and terminating a cable having a plurality of wires for carrying the network signal, wherein the connector is configured to electrically couple the plurality of wires to the first plurality of terminals, and wherein the connector is configured to electrically couple the second plurality of terminals to the third plurality of terminals such that the power signal is transmitted from the processing circuitry through the connector to the power supply.

11. The system of claim 10, wherein the network signal is a power-over-Ethernet (PoE) signal.

12. The system of claim 11, wherein the processing circuitry is connected to an Ethernet physical layer device within the housing to provide an Ethernet signal from the PoE signal to the Ethernet physical layer device.

* * * * *